114. SHIPS. 10. External Power
2. PROPULSION.
[139] Towing.
#3168X
3168 X
LIVINGSTON.

Vol. 4. pg. 969.

Peter Cooper.

Propelling Boats.

Patented Jan. 24th 1820.

Preference.

a the Water wheel.
b the shaft.
c the small wheel with a groove.
d the rope. e the other groove wheel.
fff.... standards g.g. the tow rope
h.h.h.... pulleys. i.i the boats.

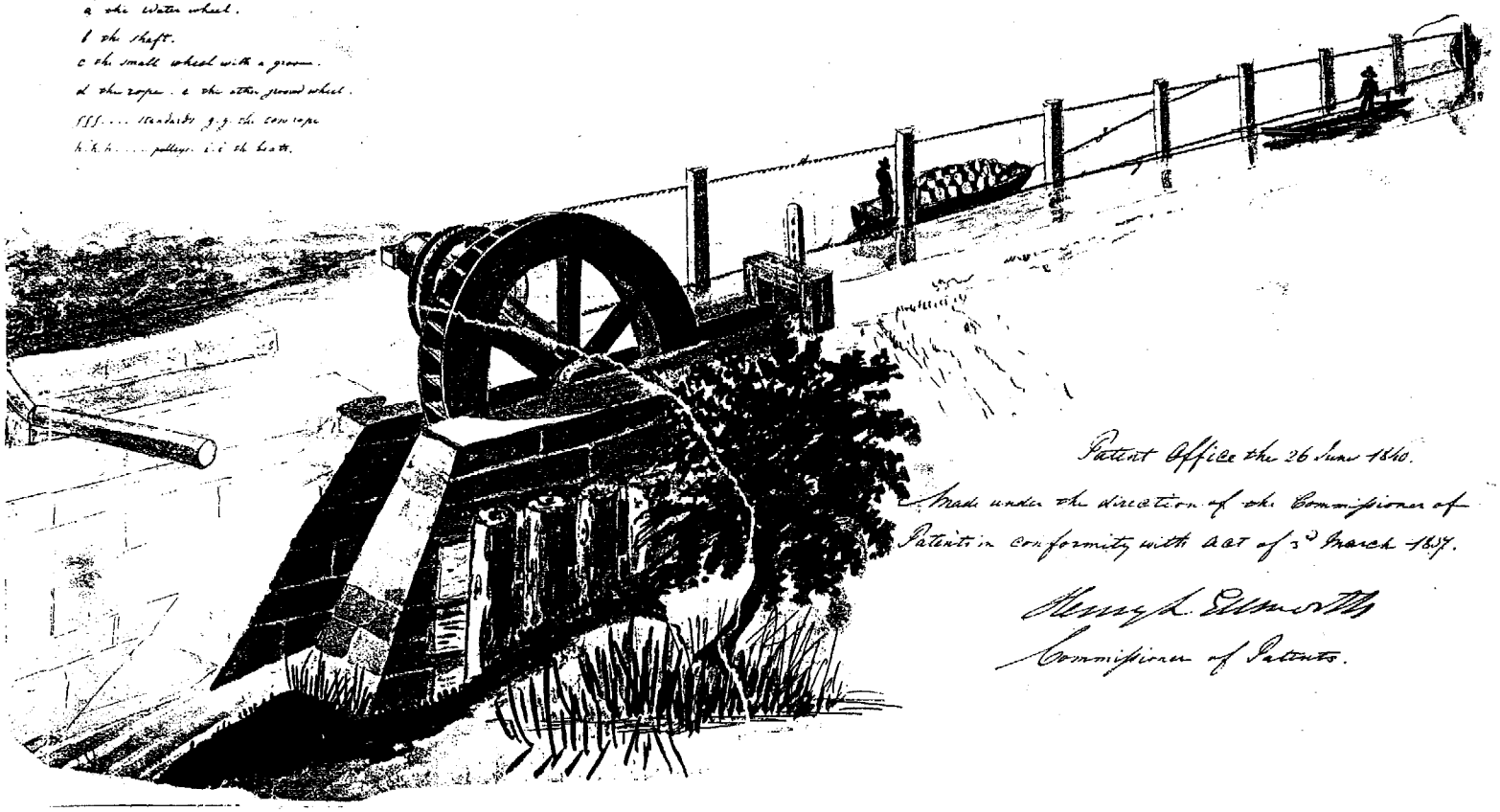

Patent Office the 26 June 1840.
Made under the direction of the Commissioner of Patents in conformity with Act of 3d March 1837.

Henry L. Ellsworth
Commissioner of Patents.